US009294931B1

United States Patent
Bennis et al.

(10) Patent No.: US 9,294,931 B1
(45) Date of Patent: Mar. 22, 2016

(54) CO-PRIMARYSPECTRUM SHARING FOR 4G/5G SMALL CELL BASE STATIONS WITH LONG TERM FAIRNESS CRITERIA

(71) Applicant: Nokia Solutions and Networks Oy, Espoo (FI)

(72) Inventors: Mehdi Bennis, Oulu (FI); Petri Luoto, University of Oulu (FI); Sumudu Samarakoon, University of Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/605,052

(22) Filed: Jan. 26, 2015

(51) Int. Cl.
*H04W 16/16* (2009.01)
*H04W 16/14* (2009.01)
*H04W 24/00* (2009.01)
*H04W 72/08* (2009.01)

(52) U.S. Cl.
CPC .............. *H04W 16/16* (2013.01); *H04W 16/14* (2013.01); *H04W 24/00* (2013.01); *H04W 72/082* (2013.01)

(58) Field of Classification Search
CPC ... H04W 16/14; H04W 72/082; H04W 24/00; H04W 72/0453; H04W 88/06
USPC .......... 455/450, 454, 464; 370/329, 338, 322, 370/336, 341, 348
See application file for complete search history.

(56) References Cited

U.S. PATENT DOCUMENTS

| | | | | |
|---|---|---|---|---|
| 2014/0148177 | A1* | 5/2014 | Ratasuk ................ | H04W 72/02 455/450 |
| 2014/0269300 | A1* | 9/2014 | Bennis .................. | H04W 28/08 370/235 |

* cited by examiner

*Primary Examiner* — Sharad Rampuria
*Assistant Examiner* — Nicole Louis-Fils
(74) *Attorney, Agent, or Firm* — Harrington & Smith

(57) ABSTRACT

An apparatus includes one or more processors and one or more memories including computer program code. The one or more memories and the computer program code are configured, with the one or more processors, to cause the apparatus to perform at least the following: allowing a first user to learn to share available radio spectrum with a second user in a coverage area of a cell, comprising, assigning a probability distribution function of a transmit configuration based on a number of component carriers in the cell, conducting a transmission from the cell, calculating a cost for operation of the cell over a selected time interval, updating the probability distribution function at an end of the selected time interval, selecting an optimal number of component carriers for use in the transmit configuration, and using the selected optimal number of component carriers to determine a sharing operation.

15 Claims, 3 Drawing Sheets

CO-PRIMARYSPECTRUM SHARING FOR 4G/5G SMALL CELL BASE STATIONS WITH LONG TERM FAIRNESS CRITERIA

TECHNICAL FIELD

This invention relates generally to wireless communication traffic and, more specifically, to co-primary spectrum sharing via cooperative use of a common pool of component carriers.

BACKGROUND

This section is intended to provide a background or context to the invention disclosed below. The description herein may include concepts that could be pursued, but are not necessarily ones that have been previously conceived, implemented, or described. Therefore, unless otherwise explicitly indicated herein, what is described in this section is not prior art to the description in this application and is not admitted to be prior art by inclusion in this section.

A cellular telecommunications network is an arrangement of interconnected telecommunications devices distributed over land areas divided into cells, each cell being served by at least one fixed-location transceiver or base station configured to provide radio coverage based on a defined set of frequencies of radio spectrum. When the cells are joined together, radio coverage is provided over a wide geographic area to enable portable transceivers (e.g., mobile communications devices such as phones, walkie-talkies, laptops, tablets, and the like) to communicate with each other. Communication takes place via the use of carriers in the forms of modulated signals of given bandwidths that convey information over channels.

Carrier aggregation is used to increase transmission bandwidths and to provide higher rates of data transfer relative to data transferred over a single carrier or channel. Carrier aggregation involves combining individual component carriers (CCs), each of which has a particular bandwidth. For each CC, there is a primary downlink carrier and an associated uplink carrier, the association of which is specific to each cell.

Current mobile network operators (MNOs) have acquired exclusive usage rights for certain frequency bands and have little incentive to share these frequency bands with other operators, despite significant research and regulatory efforts. Due to high cost and spectrum scarcity, it can be expected that an efficient use of available radio spectrum in 5G networks will rely on the sharing of radio spectrum rather than on exclusive license agreements between competing MNOs.

SUMMARY

This section contains examples of possible implementations and is not intended to be limiting to the embodiments disclosed.

In one aspect, an apparatus comprises one or more processors and one or more memories including computer program code. The one or more memories and the computer program code are configured, with the one or more processors, to cause the apparatus to perform at least the following: allowing a first user to learn to share available radio spectrum with a second user in a coverage area of a cell, comprising, assigning a probability distribution function of a transmit configuration based on a number of component carriers in the cell, conducting a transmission from the cell, calculating a cost for operation of the cell over a selected time interval, updating the probability distribution function at an end of the selected time interval, selecting an optimal number of component carriers for use in the transmit configuration, and using the selected optimal number of component carriers to determine a sharing operation.

In another aspect, a method comprises allowing a first user to learn to share available radio spectrum with a second user in a coverage area of a cell, comprising, assigning a probability distribution function of a transmit configuration based on a number of component carriers in the cell, conducting a transmission from the cell, calculating a cost for operation of the cell over a selected time interval, updating the probability distribution function at an end of the selected time interval, selecting an optimal number of component carriers for use in the transmit configuration, and using the selected optimal number of component carriers to determine a sharing operation.

In another aspect, a non-transitory computer readable storage medium comprises one or more sequences of one or more instructions which, when executed by one or more processors of an apparatus, cause the apparatus to at least: allow a first user to learn to share available radio spectrum with a second user in a coverage area of a cell, comprising, assigning a probability distribution function of a transmit configuration based on a number of component carriers in the cell, calculating a cost for operation of the cell over a selected time interval, updating the probability distribution function at an end of the selected time interval, selecting an optimal number of component carriers for use in the transmit configuration, and using the selected optimal number of component carriers to determine a sharing operation.

DETAILED DESCRIPTION OF THE DRAWINGS

In an effort to promote the cooperative utilization of available radio spectrum by base stations operating under 4G and 5G radio access technologies (RATs), a decentralized algorithm is proposed for co-primary spectrum sharing (CoPSS) in which MNOs use a shared common pool of CCs in addition to their own dedicated bandwidth. The goal of each MNO is to achieve a target data rate while ensuring the long term fair usage of the common pool of CCs.

Communications traffic between base stations utilizing RATs generally involves the use of small cells that operate on licensed spectrum bands. The small cells may also operate on unlicensed spectrum bands such as Wi-Fi. However, given that spectrum band use on both licensed and unlicensed bands is increasing and designated users of lower traffic bands are generally unwilling or unable to relinquish their rights to such bands, an alternate approach to the use of mobile spectrum involves the sharing of some bands in order to alleviate congestion on higher traffic bands. Bands that are candidates for CoPSS are those that are designated to an incumbent user but which see minimal use and/or only local use due to, for example, geographical constraints. This is generally the case in situations where spectrum is designated for use by governments or militaries.

In the operation of cells on any type of band (licensed, unlicensed, or shared), a small cell has a coverage area that is smaller than a coverage area of a macrocell, with the coverage area of the small cell underlying the coverage area of the macro cell. Small cells are fundamentally different from macrocells in that small cells are of much smaller footprints and are autonomous, self-organizing, and self-adaptive so as to maintain low operating costs. Various types of small cells include femtocells (which are connected to mobile service providers (MSPs) via a DSL, cable, or Ethernet connection and user-deployed closed/open/hybrid access), picocells (which include dedicated backhauls and operator-deployed open access), microcells (which cover limited geographical areas), and relays (which extend coverage areas). Small cells generally operate under mobile technology standards using protocols such as GSM, CDMA, TD-SCDMA, and the like.

Figure 1:
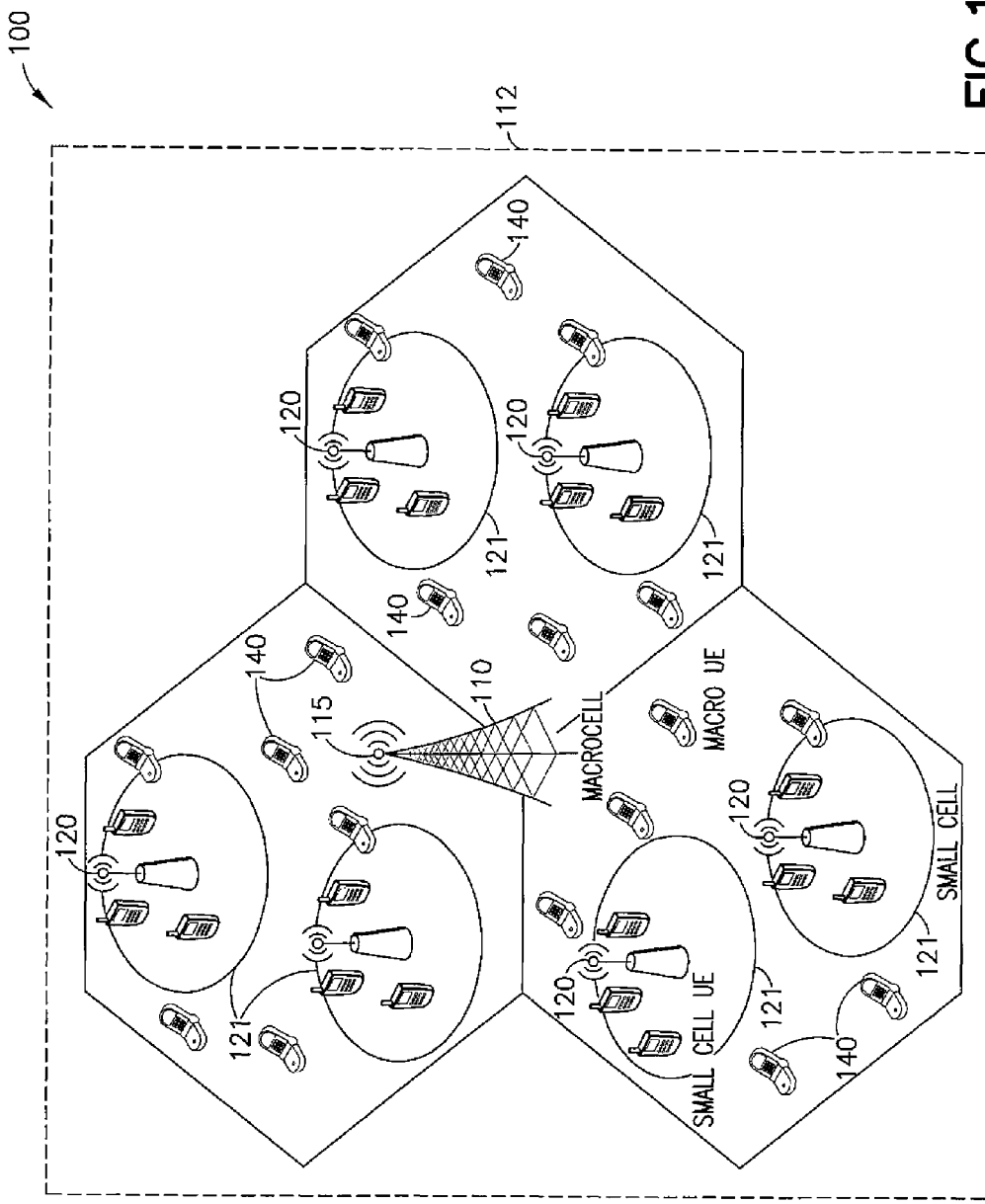
FIG. 1 is a schematic illustration of one exemplary embodiment of a heterogenous network of small cells.

Before proceeding with a more detailed description of how CoPSS is carried out, reference is made to FIG. 1, which is an exemplary illustration of a network 100 defined by a macro base station 110 (mBS 110) having one or more antennas 115 and providing a macrocell coverage area 112. Within the macrocell coverage area 112 is one or more small cell base stations 120 (SCBS 120) underlying the mBS 110 and defined by respective small cell coverage areas 121 (SCCA 121). User equipment 140 (UE 140) is configured to move within and between each SCCA 121. The mBS 110 operates over a set of frequency bands, at least a portion of which are over the shared band portion of the spectrum. Each SCBS 120 transmits over the shared bands (and can also transmit over the licensed and unlicensed bands) to serve associated UEs 140.

To achieve a target data rate in the shared bands while ensuring long term fair usage, each SCBS 120 autonomously selects an optimal number of CCs from a common pool in order to minimize a cost function associated with that SCBS 120 at a particular time. However, the achievable throughput of any SCBS 120 depends not only on its own choice of action (i.e., decision) but also on the choices of the other base stations and operators due to coupled interference over the shared CCs of the common pool. The minimization of the cost function associated with a particular SCBS 120 at a particular time can be determined using a learning-based algorithm.

Figure 2:
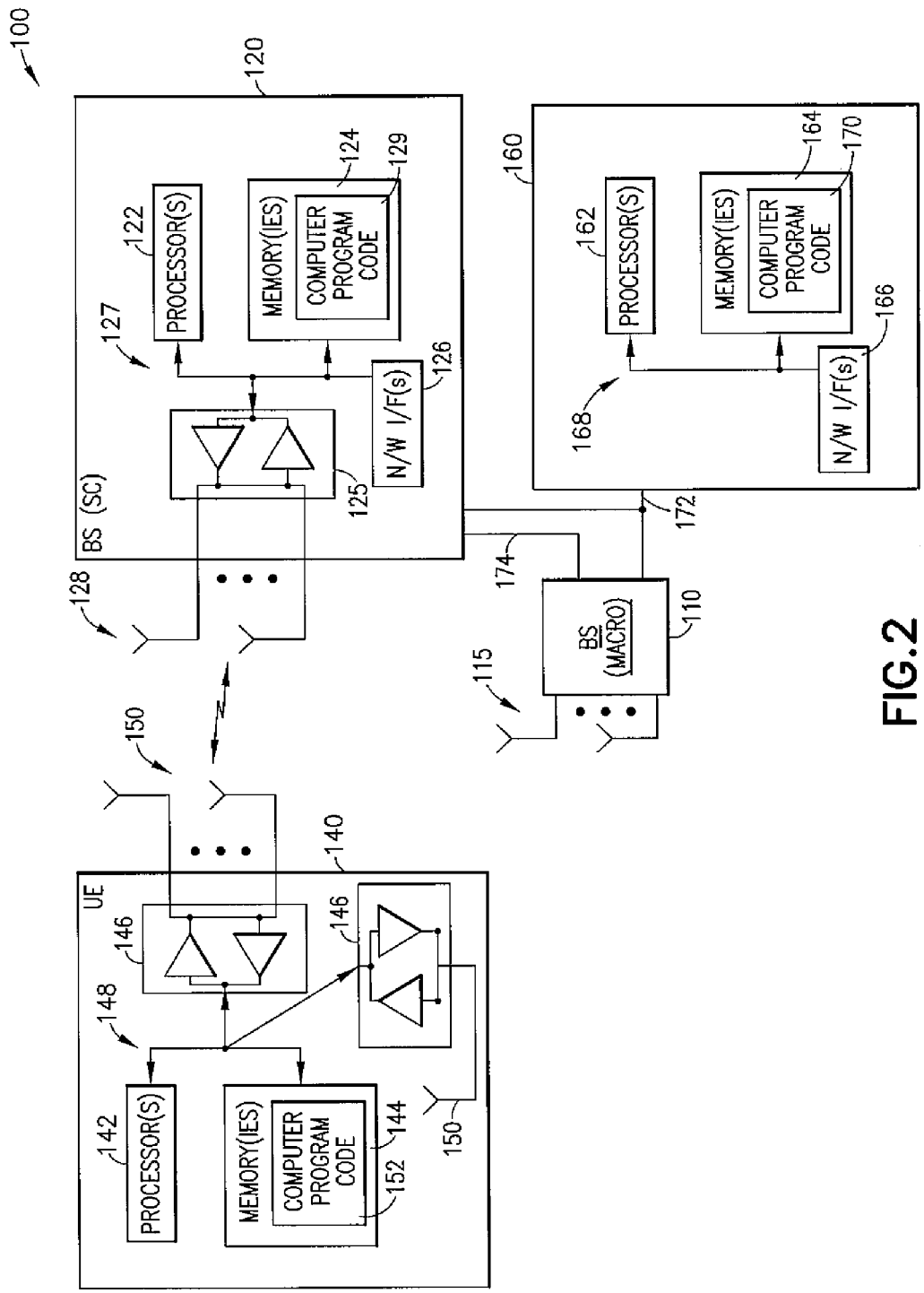
FIG. 2 is a schematic illustration of a telecommunications interaction system for use with the network of FIG. 1.

FIG. 2 illustrates an exemplary system by which the exemplary embodiments of the network 100 may be practiced. In FIG. 2, the network 100 comprises the user equipment 140 in wireless communication with the SCBS 120. The user equipment 140 includes one or more processors 142, one or more memories 144, and one or more transceivers 146 interconnected through one or more buses 148. The one or more transceivers 146 are connected to one or more antennas 150. The one or more memories 144 include computer program code 152. The memory 144 and the computer program code 152 are configured to, with the processor 142, cause the user equipment 140 to perform one or more of the operations as described herein.

The network 100 also may also comprise an O&M system 160 in wired communication with the mBS 110. The O&M system 160 provides operation and maintenance of the mBS 110 and one or more processors 162, one or more memories 164, and one or more network interfaces (N/W I/F(s)) 166 interconnected through one or more buses 168. The memories 164 include computer program code 170. The memory 164 and the computer program code 170 are configured to, with the processor 162, cause the O&M system 160 to perform one or more of the operations as described herein. The network interface 166 communicates with the mBS 110 over networks such as the networks 172, 174.

The SCBS 120 includes one or more processors 122, one or more memories 124, one or more network interfaces (N/W I/F(s)) 126, and one or more transceivers 125 interconnected through one or more buses 127. The one or more transceivers 125 are connected to one or more antennas 128, which wirelessly communicate with the one or more antennas 150 of the user equipment 140. The one or more memories 124 include computer program code 129. The one or more memories 124 and the computer program code 129 are configured to, with the processors 122, cause the SCBS 120 to perform one or more of the operations as described herein. The one or more network interfaces 126 communicate over networks such as the networks 172, 174.

The mBS 110 and the SCBS 120 communicate using, e.g., network 174. The network 174 may be wired or wireless or both and may implement, e.g., an X2 interface. The O&M system 160 uses the network 172 to communicate with the mBS 110. The network 172 may be wired or wireless or both and may implement, e.g., a Type 1 or Type 2 interface.

The computer readable memories 124 and 164 may be of any type suitable to the local technical environment and may be implemented using any suitable data storage technology, such as semiconductor based memory devices, flash memory, magnetic memory devices and systems, optical memory devices and systems, fixed memory, and removable memory. The processors 122 and 162 may be of any type suitable to the local technical environment, and may include one or more of general purpose computers, special purpose computers, microprocessors, digital signal processors (DSPs), and processors based on a multi-core processor architecture, as non-limiting examples.

The exemplary embodiments as disclosed herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In this context, a "computer-readable medium" may be any media or means that can contain, store, communicate, propagate, or transport the instructions for use by or in connection with an instruction execution system, apparatus, or device, such as a computer-based system, with one example of such a system described and depicted, e.g., in FIG. 2. A computer-readable medium may comprise a computer-readable storage medium (e.g., memory 124, 164, or other device) that may be any media or means that can contain or store the instructions for use by or in connection with an instruction execution system, apparatus, or device, such as a computer system.

To carry out the exemplary embodiments as described herein, a network model of macrocell base stations (mBS 110) operates over a set of frequency bands, at least a portion of which are over the shared spectrum. Each SCBS 120 can also transmit over the licensed bands (as well as any unlicensed bands) to serve associated UEs 140.

Figure 3:
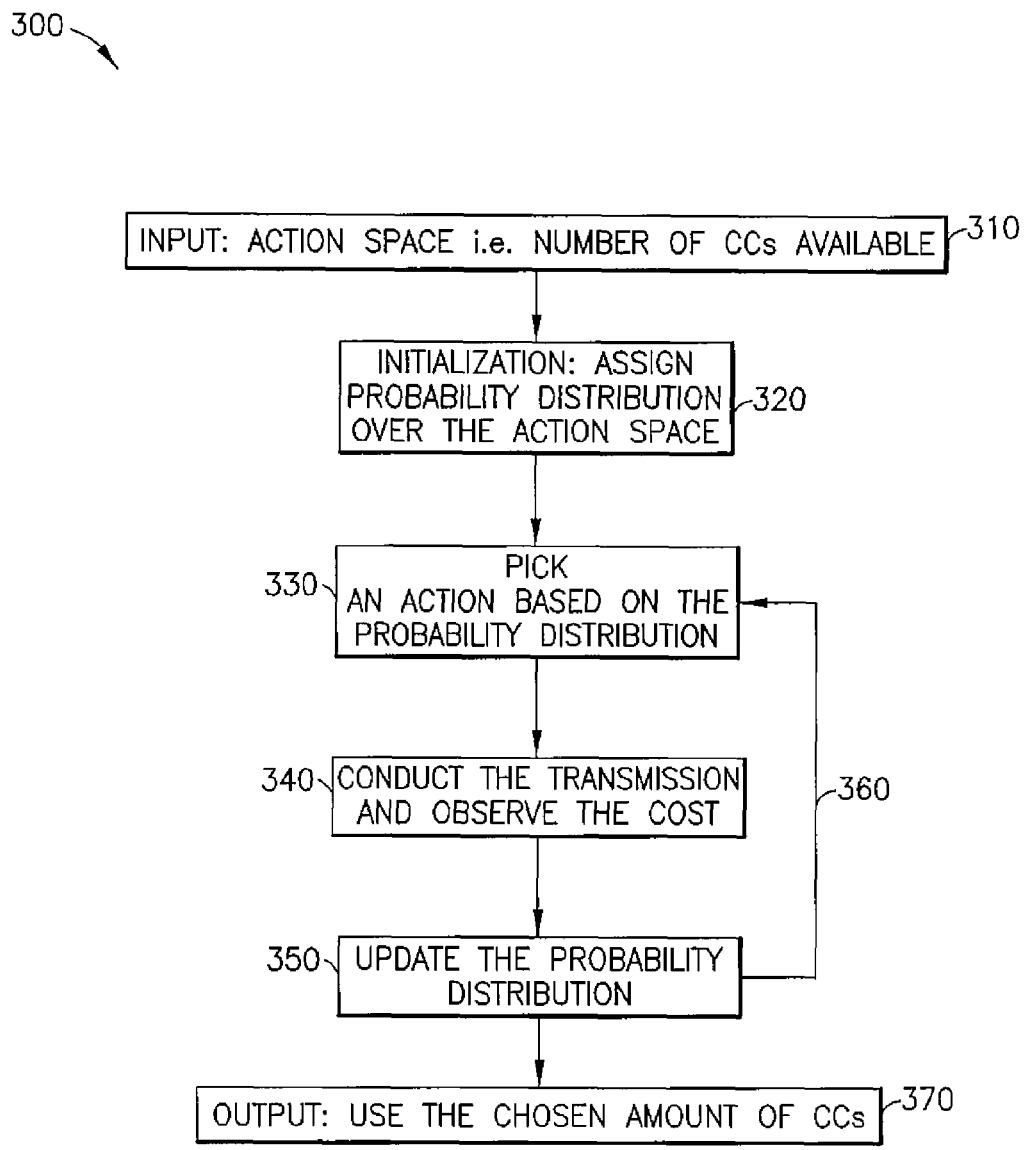
FIG. 3 is a flowchart representation of one exemplary embodiment of an algorithm for allowing a mobile network operator to learn to share available radio spectrum.

Referring now to FIG. 3, one exemplary embodiment of a flowchart representation of a process having an algorithm for use with a SCBS 120 is designated generally by the reference number 300 and is hereinafter referred to as "algorithm 300." The algorithm 300 is capable of allowing competing MNOs to learn to share available radio spectrum based on available component carriers and the updating of a probability distribution with successive calculations of a cost over time. The sharing of available radio spectrum allows for increased rates of data transfer and thus provides a more efficient use of the radio spectrum by off-loading data transfer from more crowded bands to less crowded bands.

In the algorithm 300, an input 310 is made to define action space parameters (i.e., the number of CCs available for use by a SCSB 120 is determined). In determining the input 310, an assumption is made that operators have the knowledge regarding the common pool of CCs based on the available bandwidth (which is divided to form multiple CCs). An initialization 320 is then carried out in a certain number of CCs are selected as an action. A probability distribution function is then assigned over the number of CCs available.

Each SCBS 120 chooses 330 the action (a certain number of CCs are selected from the common pool) based on the probability distribution, which is defined as:

$$\pi_b(t)=[\pi_{b,1}(t),\ldots,\pi_{b,|A_b|}(t)].\qquad\text{Eq. 1}$$

in which the SCBS 120 selects a given action $x_b(t)$ from an action space $A_b=\{0, 1/N_{cc}, \ldots, 1\}$ at time instant t. In other words, $\pi_{b,j}(t)=Pr(x_b(t)=(i-1)/N_{cc})$ is a mixed strategy of the SCBS 120 where $x_b(t)$ is the action (the fraction of used CCs) of the SCBS 120 at time t.

A transmission 340 is conducted from the SCBS 120, and a cost for operation is calculated. The cost function for any SCBS 120 at time t is defined as:

$$u_b(t) = -\left(\left(\frac{\overline{r_b}(t)+x_b(t)\overline{R}_{cc}}{R_{T_b}+\Delta R(t)}-1\right)^2 + \alpha(\overline{v_b}(t)-v_{max})\right)\qquad\text{Eq. 2}$$

where $\overline{r}_b(t)$ is the estimated average sum rate of users which are served by the SCBS 120 (based on a channel quality indicator (CQI) reported to the SCBS 120 by a user as an indication of modulation and coding schemes) and $x_b(t)$ is the fraction of CCs used by the SCBS 120 at time t (as indicated above). Also, $\overline{R}_{cc}$ is the average bits per CC, $R_{T_b}$ is the users' target sum rate when served by SCBS 120, and $\Delta R(t)$ is a rate due to extra bandwidth reservation. Thus, the first term of the cost function is an objective function.

Furthermore, the rate due to extra bandwidth allows the SCSB 120 and/or the MNO to reserve extra bandwidth in addition to any current requirements for bandwidth. This reservation of additional bandwidth in advance ensures a successful transmission from the SCBS 120 in unexpected situations such as sudden increments in interference and data rate demands.

With regard to the second term, α is the regularization coefficient of the spectrum violation, the moving time average of spectrum usage over time window T is given by $\overline{v}_b(t)$ $1/T\Sigma_{\tau=T-1}^{t}x_b(\tau)$, and $v_{max}$ is the agreed maximum spectrum sharing ratio. This second term is used to ensure the long term spectrum sharing fairness between small cell base stations and MNOs by introducing a penalty when the MNO exceeds the agreed maximum spectrum sharing ratio. When the SCBS misuses the spectrum (exceeds the agreed maximum spectrum sharing ratio), the penalty term increases, thereby resulting in an increment in the cost. Once the cost is incremented, the algorithm tries to avoid further misuses of the spectrum to minimize the cost.

Once a value for the cost function is obtained, the probability distribution function is updated 350. In the update 350, the SCBS 120 estimates its utility $\hat{u}_b(t)=[\hat{u}_{b,1}(t),\ldots,\hat{u}_{b,|A_b|}(t)]$ for each action assuming it has played the same action during all previous time slots $\{1,\ldots,t-1\}$. At each time t, the SCBS 120 updates the mixed strategy probability distribution $\pi_b$ in which the actions with higher probability are exploited while exploring the actions with low probability. Such behavior may be captured by the Boltzmann-Gibbs (BG) distribution $G_b=[G_{b,1},\ldots,G_{b,|A_b|}]$ which is calculated as follows:

$$G_{b,i}(\hat{u}_b(t)) = \frac{\exp(\kappa_b\max(0,\hat{u}_{b,i}(t)))}{\sum_{\forall i'\in x_b}\exp(\kappa_b\max(0,\hat{u}_{b,i'}(t)))}, i\in x_b\qquad\text{Eq. 3}$$

where $K_b>0$ is a temperature parameter which balances between exploration and exploitation. For each time t, all the estimations for any SCBS b, $\hat{u}_b(t)$ and $\pi_b(t)$ are updated as follows:

$$\begin{cases}\hat{u}_{b,i}(t) = \hat{u}_{b,i}(t-1) + \\ \qquad\tau_b(t)1_{\{x_{b,i}=x_b(t-1)\}}(u_b(t)-\hat{u}_{b,i}(t-1))\\ \pi_{b,i}(t) = \pi_{b,i}(t-1) + \\ \qquad\varepsilon_b(t)(G_{b,i}(\hat{u}_b(t-1))-\pi_{b,i}(t-1))\end{cases}\qquad\text{Eq. 4}$$

with the learning rates satisfying $\lim_{t\to\infty}\Sigma_{n=1}^{t}\xi(n)=\infty$ and $\lim_{t\to\infty}\Sigma_{n=1}^{t}\xi^2(n)<\infty$ for all $\xi=\{\tau,\epsilon\}$.

Upon consecutive iterations of updating the probability distribution function via a loop 360, the difference in successive values thereof should be less than some predefined value. When the target rate is achieved this term is equal to zero (or within acceptable limits), and an output 370 is generated. In the output 370, an optimal number of CCs is selected from a common pool for use by that SCBS 120 in a transmit configuration.

In using the algorithm 300, MNOs have to agree in the long term on only (i) a maximum sharing ratio through service level agreements; (ii) a time window length for ensuring long term fairness for sharing spectrum; and (iii) the penalty for exceeding the agreed maximum sharing ratio on a shorter time scale. The time window length may be the time window T, or it can be a length of time for the service level agreements (e.g., fairness over one hour, one day, or the like). Moreover, the time window length and the penalty term can be tuned based on time/scenario. For example, when the network is dense and the load is high, the penalty term may be large and the time window length may be short. In the alternative, when the network is not dense or the load is low, the penalty term may be small and the time window length may be long. As these terms are selected based on a particular situation, an efficient use of the common pool and long term fairness between MNOs can be achieved by solving the cost minimization problem with the algorithm 300.

In one exemplary embodiment, an apparatus comprises one or more processors and one or more memories including computer program code. The one or more memories and the computer program code are configured, with the one or more processors, to cause the apparatus to perform at least the following: allowing a first user to learn to share available radio spectrum with a second user in a coverage area of a cell, comprising, assigning a probability distribution function of a transmit configuration based on a number of component carriers in the cell, conducting a transmission from the cell, calculating a cost for operation of the cell over a selected time interval, updating the probability distribution function at an end of the selected time interval, selecting an optimal number of component carriers for use in the transmit configuration, and using the selected optimal number of component carriers to determine a sharing operation.

In the apparatus, assigning a probability distribution function of a transmit configuration may comprise inputting the number of component carriers in the cell. Calculating a cost for operation of the cell over a selected time interval may further comprise reserving additional bandwidth in the radio spectrum. Calculating a cost operation of the cell over a selected time interval may be modeled by:

$$u_b(t) = -\left(\left(\frac{\overline{r_b}(t) + x_b(t)\overline{R}_{cc}}{R_{T_b} + \Delta R(t)} - 1\right)^2 + \alpha(\overline{v_b}(t) - v_{max})\right)$$

where $\overline{r_b}(t)$ is the estimated average sum rate of users which are served by the cell, $x_b(t)$ is the number of component carriers used by the cell at time t, $\overline{R}_{cc}$ is the average bits per component carrier, $R_{T_b}$ is the users' target sum rate when served by the cell, $\Delta R(t)$ is a rate due to extra bandwidth reservation, $\alpha$ is the regularization coefficient of the spectrum violation, $\overline{v_b}(t)$ is the moving time average of spectrum usage over time window T, and $v_{max}$ is the agreed maximum spectrum sharing ratio. The term $\alpha(\overline{v_b}(t)-v_{max})$ may introduce a penalty when an agreed maximum spectrum sharing ratio is exceeded in order to ensure long term spectrum sharing fairness between the first user and the second user. Updating the probability distribution function may be based on the calculated cost for operation of the cell over a selected time interval. The first user may be a mobile network operator and the second user may be an incumbent user to which a band of the radio spectrum is designated. The cell may have a small coverage area.

In another exemplary embodiment, a method comprises allowing a first user to learn to share available radio spectrum with a second user in a coverage area of a cell, comprising, assigning a probability distribution function of a transmit configuration based on a number of component carriers in the cell, conducting a transmission from the cell, calculating a cost for operation of the cell over a selected time interval, updating the probability distribution function at an end of the selected time interval, selecting an optimal number of component carriers for use in the transmit configuration, and using the selected optimal number of component carriers to determine a sharing operation.

In the method, assigning a probability distribution function of a transmit configuration may comprise inputting the number of component carriers in the cell. Calculating a cost for operation of the cell over a selected time interval further comprises reserving additional bandwidth in the radio spectrum. Calculating a cost operation of the cell over a selected time interval may be modeled by:

$$u_b(t) = -\left(\left(\frac{\overline{r_b}(t) + x_b(t)\overline{R}_{cc}}{R_{T_b} + \Delta R(t)} - 1\right)^2 + \alpha(\overline{v_b}(t) - v_{max})\right)$$

where $\overline{r_b}(t)$ is the estimated average sum rate of users which are served by the cell, $x_b(t)$ is the number of component carriers used by the cell at time t, $\overline{R}_{cc}$ is the average bits per component carrier, $R_{T_b}$ is the users' target sum rate when served by the cell, $\Delta R(t)$ is a rate due to extra bandwidth reservation, $\alpha$ is the regularization coefficient of the spectrum violation, $\overline{v_b}(t)$ is the moving time average of spectrum usage over time window T, and $v_{max}$ is the agreed maximum spectrum sharing ratio. The term $\alpha(\overline{v_b}(t)-v_{max})$ may introduce a penalty when an agreed maximum spectrum sharing ratio is exceeded in order to ensure long term spectrum sharing fairness between the first user and the second user. Updating the probability distribution function may be based on the calculated cost for operation of the cell over a selected time interval. The first user may be a mobile network operator and the second user may be an incumbent user to which a band of the radio spectrum is designated. The cell may have a small coverage area.

In another exemplary embodiment, a non-transitory computer readable storage medium comprises one or more sequences of one or more instructions which, when executed by one or more processors of an apparatus, cause the apparatus to at least: allow a first user to learn to share available radio spectrum with a second user in a coverage area of a cell, comprising, assigning a probability distribution function of a transmit configuration based on a number of component carriers in the cell, calculating a cost for operation of the cell over a selected time interval, updating the probability distribution function at an end of the selected time interval, selecting an optimal number of component carriers for use in the transmit configuration, and using the selected optimal number of component carriers to determine a sharing operation.

Although various aspects of the invention are set out in above, other aspects of the invention comprise other combinations of features from the described embodiments, and not solely the combinations explicitly set out above.

It is also noted herein that while the above describes example embodiments of the invention, these descriptions should not be viewed in a limiting sense.

What is claimed is:

1. An apparatus, comprising:
one or more processors; and
one or more memories including computer program code;
the one or more memories and the computer program code configured, with the one or more processors, to cause the apparatus to perform at least the following:
allowing a first user to learn to share available radio spectrum with a second user in a coverage area of a cell, comprising,
assigning a probability distribution function of a transmit configuration based on a number of component carriers in the cell,
conducting a transmission from the cell,
calculating a cost for operation of the cell over a selected time interval, updating the probability distribution function at an end of the selected time interval,
selecting an optimal number of component carriers for use in the transmit configuration; and
using the selected optimal number of component carriers to determine a sharing operation;
wherein calculating a cost operation of the cell over a selected time interval is modeled $$u_b(t) = -\left(\left(\frac{\overline{r_b}(t) + x_b(t)\overline{R}_{cc}}{R_{T_b} + \Delta R(t)} - 1\right)^2 + \alpha(\overline{v_b}(t) - v_{max})\right)$$

where $\overline{r_b}(t)$ is the estimated average sum rate of users which are served by the cell, $x_b(t)$ is the number of component carriers used by the cell at time t, $\overline{R}_{cc}$ is the average bits per component carrier, $R_{T_b}$ is the users' target sum rate when served by the cell, $\Delta R(t)$ is a rate due to extra bandwidth reservation, $\alpha$ is the regularization coefficient of the spectrum violation, $\overline{v_b}(t)$ is the moving time average of spectrum usage over time window T, and $v_{max}$ is the agreed maximum spectrum sharing ratio.

2. The apparatus of claim 1, wherein assigning a probability distribution function of a transmit configuration comprises inputting the number of component carriers in the cell.

3. The apparatus of claim 1, wherein calculating a cost for operation of the cell over a selected time interval further comprises reserving additional bandwidth in the radio spectrum.

4. The apparatus of claim 1, wherein $\alpha(\overline{v_b}(t)-v_{max})$ introduces a penalty when an agreed maximum spectrum sharing ratio is exceeded in order to ensure long term spectrum sharing fairness between the first user and the second user.

5. The apparatus of claim 1, wherein updating the probability distribution function is based on the calculated cost for operation of the cell over a selected time interval.

6. The apparatus of claim 1, wherein the first user is a mobile network operator and the second user is an incumbent user to which a band of the radio spectrum is designated.

7. The apparatus of claim 1, wherein the cell has a small coverage area.

8. A method, comprising:
allowing a first user to learn to share available radio spectrum with a second user in a coverage area of a cell, comprising,
assigning a probability distribution function of a transmit configuration based on a number of component carriers in the cell,
conducting a transmission from the cell,
calculating a cost for operation of the cell over a selected time interval, updating the probability distribution function at an end of the selected time interval,
selecting an optimal number of component carriers for use in the transmit configuration; and
using the selected optimal number of component carriers to determine a sharing operation;
wherein calculating a cost operation of the cell over a selected time interval is modeled by;

$$u_b(t) = -\left(\left(\frac{\overline{r_b}(t) + x_b(t)\overline{R}_{cc}}{R_{T_b} + \Delta R(t)} - 1\right)^2 + \alpha(\overline{v_b}(t) - v_{max})\right)$$

where $\overline{r_b}(t)$ is the estimated average sum rate of users which are served by the cell, $x_b(t)$ is the number of component carriers used by the cell at time t, $\overline{R}_{cc}$ is the average bits per component carrier, $R_{T_b}$ is the users' target sum rate when served by the cell, $\Delta R(t)$ is a rate due to extra bandwidth reservation, $\alpha$ is the regularization coefficient of the spectrum violation, $\overline{v_b}(t)$ is the moving time average of spectrum usage over time window T, and $v_{max}$ is the agreed maximum spectrum sharing ratio.

9. The method of claim 8, wherein assigning a probability distribution function of a transmit configuration comprises inputting the number of component carriers in the cell.

10. The method of claim 8, wherein calculating a cost for operation of the cell over a selected time interval further comprises reserving additional bandwidth in the radio spectrum.

11. The method of claim 8, wherein $\alpha(\overline{v_b}(t)-v_{max})$ introduces a penalty when an agreed maximum spectrum sharing ratio is exceeded in order to ensure long term spectrum sharing fairness between the first user and the second user.

12. The method of claim 8, wherein updating the probability distribution function is based on the calculated cost for operation of the cell over a selected time interval.

13. The method of claim 8, wherein the first user is a mobile network operator and the second user is an incumbent user to which a band of the radio spectrum is designated.

14. The method of claim 8, wherein the cell has a small coverage area.

15. A non-transitory computer readable storage medium, comprising one or more sequences of one or more instructions which, when executed by one or more processors of an apparatus, cause the apparatus to at least:
allow a first user to learn to share available radio spectrum with a second user in a coverage area of a cell, comprising,
assigning a probability distribution function of a transmit configuration based on a number of component carriers in the cell,
calculating a cost for operation of the cell over a selected time interval,
updating the probability distribution function at an end of the selected time interval,
selecting an optimal number of component carriers for use in the transmit configuration; and
using the selected optimal number of component carriers to determine a sharing operation;
wherein calculating a cost operation of the cell over a selected time interval is modeled by;

$$u_b(t) = -\left(\left(\frac{\overline{r_b}(t) + x_b(t)\overline{R}_{cc}}{R_{T_b} + \Delta R(t)} - 1\right)^2 + \alpha(\overline{v_b}(t) - v_{max})\right)$$

where $\overline{r_b}(t)$ is the estimated average sum rate of users which are served by the cell, $x_b(t)$ is the number of component carriers used by the cell at time t, $\overline{R}_{cc}$ is the average bits per component carrier, $R_{T_b}$ is the users' target sum rate when served by the cell, $\Delta R(t)$ is a rate due to extra bandwidth reservation, $\alpha$ is the regularization coefficient of the spectrum violation, $\overline{v_b}(t)$ is the moving time average of spectrum usage over time window T, and $v_{max}$ is the agreed maximum spectrum sharing ratio.

* * * * *